Patented Aug. 14, 1951

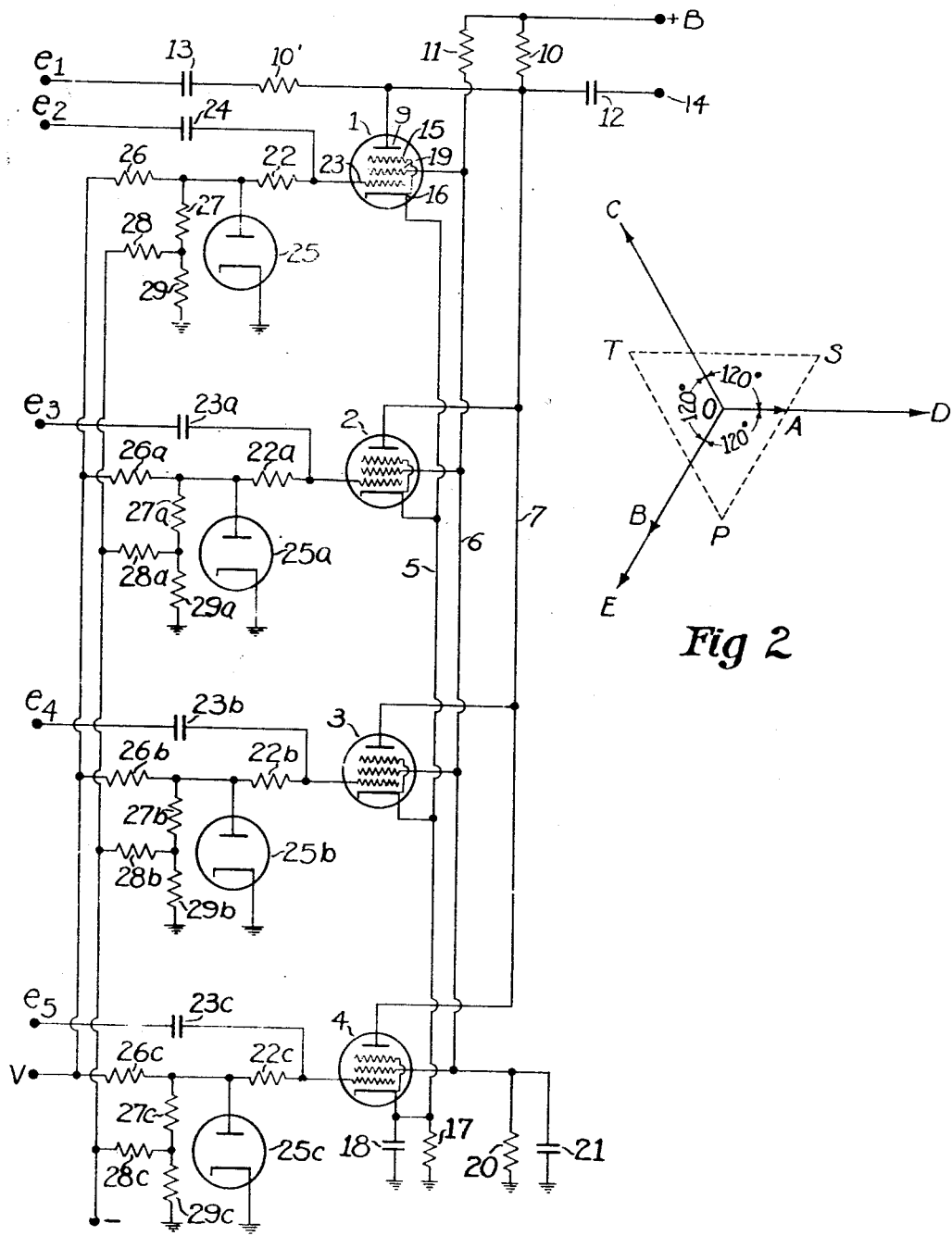

2,563,954

UNITED STATES PATENT OFFICE 2,563,954

ELECTRONIC PHASE SHIFTER

Richard C. Palmer, Nutley, N. J., assignor to Allen B. Du Mont Laboratories, Inc., Passaic, N. J., a corporation of Delaware Application September 29, 1947, Serial No. 776,738

7 Claims. (Cl. 323—119)

This invention relates to improvements in electronic phase shifters.

With this invention the phase of a sine wave signal of constant frequency can be shifted through any desired number of electrical degrees by utilizing a direct current control voltage. The phase shift is not limited to 360°.

With this invention means are provided whereby a D. C. voltage variation may be used to produce a phase shift in an A. C. voltage. An unlimited phase shift with an accompanying variation in amplitude of two to one may be obtained by using a suitable number of phase shifting tubes.

The invention may be understood from the description in connection with the accompanying drawing in which:

Fig. 1 is a schematic diagram of a circuit showing an embodiment of the invention, and Fig. 2 is a vector diagram of the voltages existing in the common plate load of the circuit.

Referring to the vector diagram of Fig. 2, it will be seen that if successively greater magnitudes of the vector OB from zero to its full value OB are added to the vector OA, the resultant will vary from OA to OP, the terminus of the resultant always being located on the line AP. If now successive magnitudes of the vector OC from zero to its full value OC are added to the vector OP, the resultant will vary from OP to OT, the terminus of the resultant always being located on the line PT. Similarly, the resultant may be made to follow the triangle APTSPTS . . . by sequentially adding the vectors OD, OE, OC, OD . . . to the vector OA. The phase of the resultant will thus change continuously as this sequential addition is carried out. The phase may be made to vary in the opposite sense by locating the vectors OB and OE in the second quadrant and OC in the third. The magnitude of the resultant will vary over a two to one range if the relative magnitude of the vectors OA, OB, OC, OD, and OE are 1, 2, 3, 3, and 3 and if the phase angles between these vectors are 120°.

The device is shown diagrammatically in Fig. 1 for carrying out the invention.

In this figure a plurality of electronic discharge devices which are tubes 1, 2, 3 and 4 are shown. The cathodes, screen grids and plates of these tubes are respectively connected to one another by leads 5, 6 and 7. For simplicity, the connections of only one of these devices need be described, the others being connected in the same way.

The plate 9 of tube 1 is connected to one end of each of the resistors 10 and 10' and to one side of condenser 12. The other end of resistor 10 and one end of resistor 11 are connected to a source B of positive potential. The other end of resistor 10' is connected to one side of capacitor 13 the other side of which is connected to a source $e_1$ of potential. The phase of this potential $e_1$ is the one to be shifted. The other side of capacitor 12 is connected to terminal 14 from which point the phase shifted potential is taken.

The suppressor grid 15 of tube 1 is connected to its cathode 16 which is connected to one end of resistor 17, the other end of which is grounded, and to one side of capacitor 18 the other side of which is grounded.

The screen grid 19 of tube 1 is connected to one end of resistors 11 and 20 and one side of capacitor 21. The other end of resistor 11 is connected to a source B of positive potential. The other end of resistor 20 and the other side of capacitor 21 are grounded.

The control grid 23 of tube 1 is connected to resistor 22 and one side of capacitor 24. The other end of resistor 22 is connected to the plate of diode 25 and to one end of resistors 26 and 27. The cathode of diode 25 is grounded. The other end of resistor 26 is connected to a source of variable voltage V. The other side of capacitor 24 is connected to a source of voltage $e_2$ the phase of which has been shifted so that it leads the phase of $e_1$ by 60° so that the voltage developed across the plate load resistor 10 by tube 1 has the same phase as the vector OB shown in Fig. 2. The other end of resistor 27 is connected to the juncture of resistors 28 and 29. The other end of resistor 28 is connected to a source of negative potential. The other end of resistor 29 is grounded.

Tubes 2, 3 and 4 are connected in the same way to voltages $e_3$, $e_4$, and $e_5$. The connections are indicated by the same reference characters with subscripts to distinguish them. Voltage $e_3$ lags $e_2$ by 120°, voltage $e_4$ lags voltage $e_3$ and voltage $e_5$ lags voltage $e_4$ the same amount.

The operation is as follows:

In the diagram of Fig. 1, the signal $e_1$, the voltage, the phase of which is to be shifted, is coupled by condenser 13 to the divider consisting of resistors 10' and 10. That portion of $e_1$ existing across resistor 10 represents the vector OA of Fig. 2. Resistor 10 is a common plate load for the tubes 1, 2, 3 and 4, each of which is adjusted so that its gain is controlled by its control grid bias. Suitably phased signals $e_2$, $e_3$, $e_4$ and $e_5$ are applied to the grids of tubes 1, 2, 3 and 4, respectively, so that at maximum gain of each tube, signals corresponding to the vectors OB, OC, OD and OE, respectively, are generated in the common plate load 10.

The tubes 1, 2, 3 and 4 are biased negatively through resistors 27, 27a, 27b and 27c, respectively, to such an extent that with zero control voltage V their grids rest at voltages 1, 2, 3 and 4 times their cut off bias, respectively.

When a control voltage V applied through resistors 26, 26a, 26b and 26c is increased in the positive direction, the grids of tubes 1, 2, 3 and 4, respectively, are driven through their operating ranges, and the sequential addition of the several signals occurs in the plate load 10. The resultant signal across the plate load 10 then varies in phase up to an angle of 450°, with an accompanying variation of amplitude of two to one. However, the phase may be varied more or less by using more or less than four tubes. Diodes 25, 25a, 25b and 25c prevent the grids of tubes 1, 2, 3 and 4, respectively, from becoming sufficiently positive to cause distortion of the output signal. These diodes may, if desired, be replaced by crystal rectifiers. The output signal is coupled from resistor 10 to terminal 14 by condenser 12.

When the signal $e_1$ is applied, that portion of it that causes a drop of potential across resistor 10 is represented in Fig. 2 by vector OA. This resistor is the common plate load for all of the tubes 1 to 4. The gain acting on each signal $e_2$ to $e_5$ that is applied to these tubes respectively is controlled by the biases of the grids of these tubes. The signals $e_2$ to $e_5$ that are applied to these tubes are so phased and adjusted in magnitude that the voltages they cause to be developed across the common plate load 10 may be represented by the vectors OB, OC, OD and OE, respectively, of Fig. 2.

If the two to one variation in amplitude of the output voltage is objectionable, conventional limiters and filters may be used in the well known manner to keep the output voltage constant.

In the above description, pentodes have been described as the phase shifting tubes. However, other types of electronic discharge devices, with more or less elements, such as triodes, may be used instead as the invention is by no means limited to pentodes.

What is claimed is:

1. An electronic phase shifting circuit comprising a source of substantially sinusoidal signal voltage, a source of second sinusoidal signal voltage of the same frequency as said first signal voltage, said second signal voltage having a phase angle other than an integral multiple of $\pi$ radians with respect to said first signal voltage, an amplifier stage connected to said second signal voltage, said amplifier stage having a predetermined maximum gain and comprising an amplifier tube having a plate, a cathode, and a control grid, a resistive load connected in series between said plate and said cathode, said first signal voltage being connected across said load, and a source of a third signal voltage connected to said amplifier tube between said grid and said cathode to vary the gain of said amplifier.

2. An electronic phase shifting circuit comprising a source of substantially sinusoidal signal voltage, a source of second sinusoidal signal voltage of the same frequency as said first signal voltage, said second signal voltage having a phase angle of $\pi/3$ radians with respect to said first signal voltage, an amplifier stage for said second signal voltage, said amplifier stage having a predetermined maximum gain and comprising an amplifier tube having a plate, a cathode, and a control grid, a resistive plate load for said amplifier, said first signal voltage being connected across said load, and a source of third signal voltage connected in series between said grid and said cathode to vary the gain of said amplifier.

3. An electronic phase shifting circuit comprising a source of substantially sinusoidal signal voltage, a source of second sinusoidal signal voltage of the same frequency as said first signal voltage, said second signal voltage having a phase angle of $\pi/3$ radians with respect to said first signal voltage, an amplifier stage for said second signal voltage, said amplifier stage having a predetermined maximum gain and comprising an amplifier tube having a plate, a cathode, and a control grid, a resistive plate load for said amplifier tube, said first signal voltage being connected across said load and having a maximum amplitude equal to:

$$A = \frac{B(G)}{2}$$

where B is the amplitude of said second signal voltage, G is the gain of said amplifier, and A is the maximum amplitude of said first signal voltage, and a source of third voltage connected in series between said grid and said cathode to vary the gain of said amplifier up to said predetermined maximum gain.

4. An electronic phase shifting circuit comprising a source of substantially sinusoidal signal voltage, a source of second sinusoidal signal voltage of the same frequency as said first signal voltage, said second signal voltage having a phase angle other than an integral multiple of $\pi$ radians with respect to said first signal voltage, an amplifier for said second signal voltage, said amplifier stage having a predetermined maximum gain and comprising a thermionic amplifier tube having a plate, a cathode, and a plurality of grids including a control grid, a resistive plate load for said amplifier tube, said first signal voltage being connected to said plate, a source of third voltage connected in series between said control grid and said cathode to vary the gain of said amplifier from zero to said predetermined maximum.

5. An electronic phase shifting circuit comprising a source of substantially sinusoidal signal voltage, a source of second sinusoidal signal voltage of the same frequency as said first signal voltage, said second signal voltage having a phase angle other than an integral multiple of $\pi$ radians with respect to said first signal voltage, an amplifier stage for said second signal voltage, said amplifier stage having a predetermined maximum gain and comprising an amplifier tube having a plate, a cathode, and a control grid, a resistive load for said amplifier tube connected in series between said plate and said cathode, said first signal voltage being connected across said load, means to vary the gain of said amplifier from zero to said predetermined maximum, said means comprising a third voltage connected in series between said grid and said cathode, and a diode in parallel with said source of third voltage to prevent said third voltage from increasing beyond a predetermined value.

6. An electronic phase shifting circuit comprising a source of substantially sinusoidal signal voltage, a source of second sinusoidal signal voltage of the same frequency as said first signal voltage and having a predetermined phase relationship with respect to said first signal voltage, a source of third sinusoidal signal voltage of the same frequency as said first signal voltage and having a different phase with respect to said first signal voltage than said first named phase, an amplifier stage for said second signal voltage, said amplifier stage having a predetermined maximum gain and comprising an amplifier tube having a plate, a cathode, and a control grid, an amplifier stage for said third signal voltage, said last named amplifier stage comprising an amplifier tube having a plate, a cathode, and a control grid, a conductive connection between said plates, a second conductive connection between said cathodes, a common resistive load in series between said plates and said cathodes, a source of first bias voltage in series between said first named grid and said first named cathode, a source of second bias voltage between said second named grid and said second named cathode, one of said bias voltages being equal to the cut-off bias of the tube to which it is applied and the other of said bias voltages having a magnitude equal to the cut-off bias of the tube to which it is applied plus a value equal to the magnitude of the other of said bias voltages, both of said bias voltages being connected so as to make the cathodes more positive than the respective grids, and means to vary the effective bias on said tubes, said means comprising a source of fourth voltage connected between said grids and said cathodes to overcome a portion of said bias voltages.

7. In an electronic phase shifting circuit comprising a plurality of amplifier tubes, each of said amplifier tubes having a plate, a cathode, and a control grid, the plates of said tubes being connected together and the cathodes of said tubes being connected together, five sources of substantially sinusoidal signal voltages of the same frequency the first of said voltages having a given amplitude, the second of said voltages having a phase angle of $\pi/3$ radians with respect to said first voltage and an amplitude, when maximally amplified by a first of said tubes, twice as great as the amplitude of said first voltage, the third of said voltages having a phase angle of $\pi/3$ radians with respect to said first voltage and ($2/3$) $\pi$ radians with respect to said second voltage and an amplitude, when maximally amplified by a second of said tubes, three times as great as the amplitude of said first voltage, a fourth of said voltages having a phase angle of $\pi$ radians with respect to said first voltage and an amplitude, when maximally amplified by a third of said tubes, equal to the amplitude of said third voltage, and the fifth voltage in phase with said second voltage and having an amplitude, when maximally amplified by a fourth of said tubes, equal to the amplitude of said third voltage, a common plate load for said amplifier tubes, said first voltage being applied across said common plate load, a source of bias voltage for each of said amplifier tubes and connected in series between the cathode and control grid thereof to raise the potential of said cathode positive with respect to said grid, the magnitude of the bias voltage on said first tube being sufficient to render said tube non-conducting, the magnitude of the bias voltage on said second tube being greater than the magnitude of said first bias voltage by an amount equal to the cut-off bias of said second tube, the magnitude of the bias voltage on said third tube being greater than the magnitude of said bias on said second tube by an amount equal to the cut-off bias of said third tube, the magnitude of the bias voltage on said fourth tube being greater than the magnitude of said bias on said third tube by an amount equal to the cut-off bias of said fourth tube, a source of residual bias voltage connected to each of said tubes, a plurality of voltage dividers, each of said dividers comprising a pair of impedances joined at a common terminal, one said impedance of each said voltage divider being connected in series with the cathode, grid, said residual bias voltage and said first mentioned bias voltage for the respective tube, the other said impedance of each said divider being connected to a third source of bias voltage, and a plurality of unidirectional current conducting electron discharge devices, each of said electron discharge devices being connected respectively across that part of each of said series circuits comprising said first mentioned bias voltage for the respective tube and said impedance connected in series therewith, said device being connected so as to conduct current from said grid toward said cathode.

RICHARD C. PALMER.

REFERENCES CITED

The following references are of record in the file of this patent:

UNITED STATES PATENTS

| Number | Name | Date |
|---|---|---|
| 2,146,862 | Shumard | Feb. 14, 1939 |
| 2,274,365 | Gardiner | Feb. 27, 1942 |
| 2,288,740 | Peterson | July 7, 1942 |